UNITED STATES PATENT OFFICE.

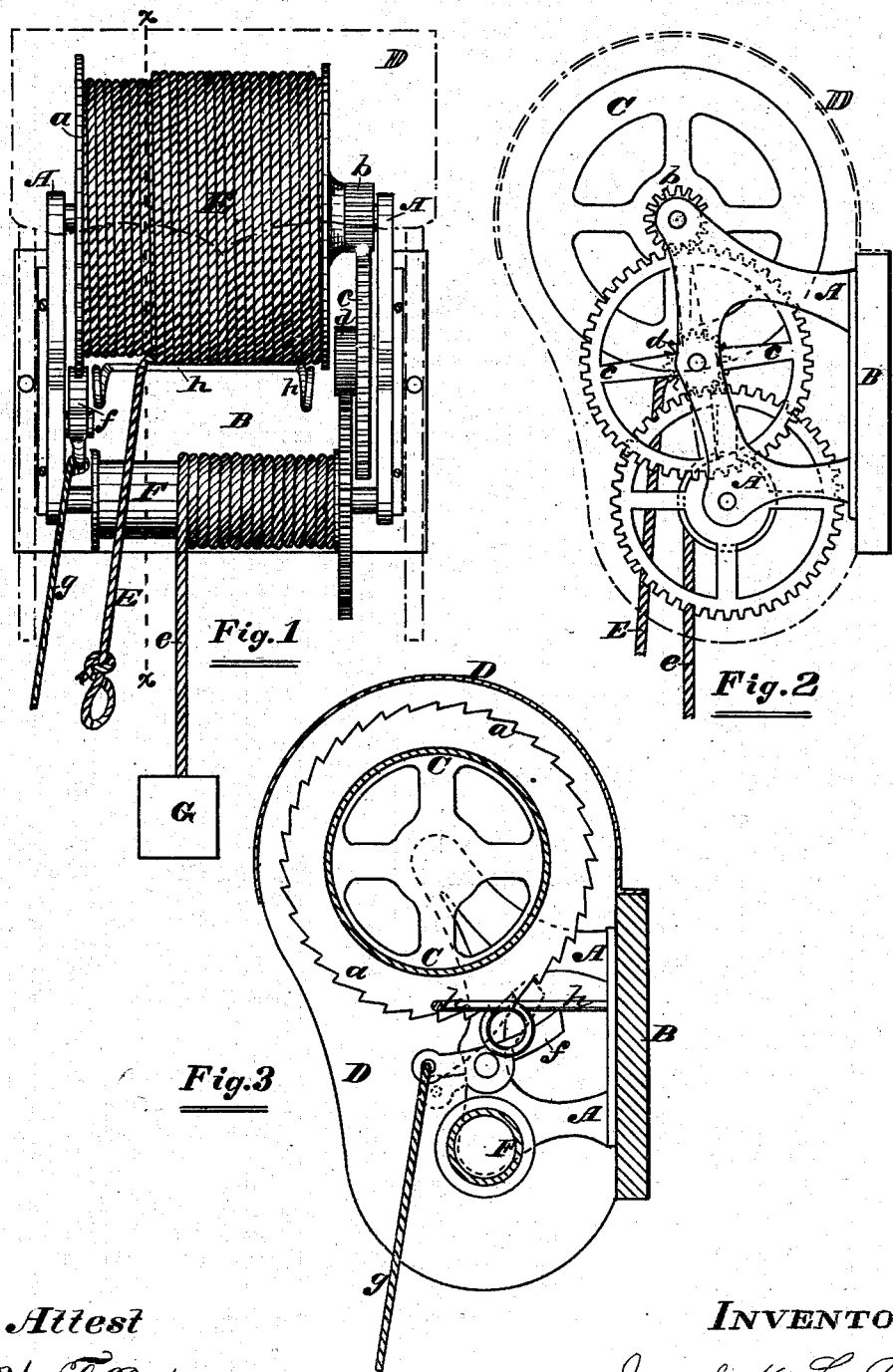

JACOB H. LE ROW, OF CHICAGO, ASSIGNOR OF ONE-HALF HIS RIGHT TO GEORGE W. BROWN, OF OAK PARK, ILLINOIS.

IMPROVEMENT IN CLOTHES-LINE REELS.

Specification forming part of Letters Patent No. 186,586, dated January 23, 1877; application filed December 2, 1876.

*To all whom it may concern:*

Be it known that I, JACOB H. LE ROW, of Chicago, in the county of Cook and State of Illinois, have invented certain new and useful Improvements in Self-Acting Clothes-Line Reels; and I do hereby declare that the following is a full, clear, and exact description thereof, reference being had to the accompanying drawing, and to the letters of reference marked thereon, which form a part of this specification.

In the accompanying drawings, Figure 1 is a front view of my clothes-line reel, with hood or covering shown by broken lines. Fig. 2 is an end view of same. Fig. 3 is a section on line $x\,x$, Fig. 1.

The subject of this invention is a cheap and effective device for protecting a clothes-line from the elements, likewise from dirt, and to facilitate, by means of a self-acting mechanism, the operation of putting up and taking down the same.

A is a frame, made of iron or other suitable material, secured by bolts or other means to a back piece, B. C is a revolving reel, having a ratchet-wheel, $a$, and small gear-wheel $b$. D is a hood or covering, which fits over the reel C, forming with the back piece B a housing for the mechanism. Although shown in the drawing to extend but partly over the front of the reel, it will be evident that it may be extended so as to cover the entire front of the machine, leaving only an opening at the bottom. Upon the reel C it is intended to wind the line E.

The small gear-wheel $b$ engages in the large gear-wheel $c$, which is journaled independently in the frame A, and which has small gear-wheel $d$, engaging in the large gear-wheel on shaft F. To the cord $e$ is attached a weight, G. The pawl $f$ is made to engage in the ratchet $a$ by means of the cord $g$. $h$ is a controller, made of spring-wire, the ends of which are set in the back piece B. It acts upon the line F to keep it in regular courses, and prevent the tendency to double back while being wound upon the reel.

The operation of my device, as will have become apparent from the foregoing description and reference to the drawing, is as follows: When not in use, the line E will be wound upon the reel C, at which time the cord $e$, holding weight G, will be unwound.

To put up the line the operator simply pulls it out to such length as may be required, when, by pulling the cord $g$, the pawl $f$ engages in ratchet $a$, preventing any further unwinding of the line from the reel, thus constituting the only necessary fastening at that end. In taking down the line, all that is required is to unfasten the same and walk toward the reel. The weight G, acting upon the shaft F, causes the reel C to revolve by means of the gear-wheels $b\,c\,d$, thus easily and rapidly winding up the line.

It will be seen that this device may be fastened upon a post, tree, building, or other suitable or convenient object. It provides a safe and always convenient receptacle for the line, wherein it is protected, when not in use, from dirt or storms, and it greatly facilitates the process of putting up and taking down the same.

What I claim is—

The combination of the reel C, having ratchet $a$ and gear-wheel $b$, and the follower $h$, with the shaft F, gear-wheels $b\,c$, and weight G, all constructed in the manner herein described, for the purpose specified.

In testimony whereof I have hereunto affixed my signature this 18th day of November, 1876, in presence of two witnesses.

JACOB H. LE ROW.

Witnesses:
 A. H. HITCHCOCK,
 J. B. GRIDLEY.